(12) United States Patent
Marquardt

(10) Patent No.: US 9,103,543 B2
(45) Date of Patent: Aug. 11, 2015

(54) LAMP TABLET DOCKING STATION

(71) Applicant: Christopher Marquardt, Larchmont, NY (US)

(72) Inventor: Christopher Marquardt, Larchmont, NY (US)

(*) Notice: Subject to any disclaimer, the term of this patent is extended or adjusted under 35 U.S.C. 154(b) by 97 days.

(21) Appl. No.: 13/939,394

(22) Filed: Jul. 11, 2013

(65) Prior Publication Data

US 2015/0016114 A1    Jan. 15, 2015

(51) Int. Cl.
*F21V 33/00* (2006.01)
*F21V 21/26* (2006.01)
*G06F 1/16* (2006.01)
*F21V 23/06* (2006.01)

(52) U.S. Cl.
CPC ................ *F21V 21/26* (2013.01); *F21V 23/06* (2013.01); *G06F 1/1632* (2013.01)

(58) Field of Classification Search
CPC .............................. F21V 33/00; F21V 33/006
USPC ........................ 362/253, 438, 436; 248/122.1
See application file for complete search history.

(56) References Cited

U.S. PATENT DOCUMENTS

| | | | |
|---|---|---|---|
| 2,034,913 A * | 3/1936 | Kros .............................. | 362/396 |
| 5,751,548 A | 5/1998 | Hall et al. | |
| 6,394,402 B2 | 5/2002 | Coonan et al. | |
| 6,736,364 B2 | 5/2004 | Oddsen, Jr. | |
| 7,564,682 B2 | 7/2009 | Liou et al. | |
| 2002/0141198 A1 | 10/2002 | Yu et al. | |
| 2005/0270731 A1 | 12/2005 | Yin | |
| 2006/0193141 A1 * | 8/2006 | Farmer .......................... | 362/382 |
| 2006/0209530 A1 * | 9/2006 | Schaak .......................... | 362/86 |
| 2007/0097689 A1 | 5/2007 | Barausky et al. | |
| 2010/0039792 A1 * | 2/2010 | Meyers et al. .................. | 362/20 |
| 2010/0238653 A1 * | 9/2010 | Pelletier et al. ............... | 362/191 |
| 2011/0051437 A1 * | 3/2011 | Ng et al. ....................... | 362/427 |
| 2012/0113645 A1 * | 5/2012 | Liao et al. ..................... | 362/253 |
| 2013/0026309 A1 | 1/2013 | Ball et al. | |

FOREIGN PATENT DOCUMENTS

KR    10-2009-0099729    9/2009

OTHER PUBLICATIONS

International Search Report and Written Opinion of the International Searching Authority (for a PCT application containing similar claims to the current application).

* cited by examiner

*Primary Examiner* — Evan Dzierzynski
(74) *Attorney, Agent, or Firm* — Superior IP, PLLC; Dustin L. Call

(57) ABSTRACT

A lamp stand docking station. The lamp stand docking station includes a base, wherein the base is configured to support the lamp stand docking station. The lamp stand docking station also includes a clamp attached to the base. The clamp includes an adjustable arm for securing an external device and a lamp.

17 Claims, 4 Drawing Sheets

LAMP TABLET DOCKING STATION

CROSS-REFERENCE TO RELATED APPLICATION

Not applicable

BACKGROUND OF THE INVENTION

Connected tablet computing will play a greater role in the entertainment and maintenance of the modern household, but existing device support and positioning solutions limit the solutions possibilities that tablets offer. For example, some tv providers now provide apps or networking that allow subscribers to watch programming on tablets or computers. Thus users may have a tv but rarely watch the actual tv because of the convenience and mobility provided by using a tablet. For instance, a parent may allow children who are not in the home full-time, such as college students to view programming via the parent's subscription, allowing the child to save the money of a redundant subscription.

In addition, tablets have become much more than computing devices. They serve as game devices, messaging centers an serve many other functions. Many users carry tablets with them constantly, using them to serve as multi-purpose devices that allow the user to stay in touch or consume entertainment.

However, this increase usage has led to a number of drawbacks. For example, tablets need to be laid horizontally, a special stand is purchased or improvised to hold the tablet at a desired angle or the user holds the tablet. This tends to mean that the tablet is held in a single position, regardless of circumstances.

Accordingly, there is a need in the art for a device which can safely and flexibly position a tablet computer for hands-free use that is integrated into a basic home appliance without compromising beauty or utility. Moreover, there is a need in the art for a device which enhances the value of tablet computers for many needs around the home, such as home entertainment and telecommunications.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a lamp stand docking station. The lamp stand docking station includes a base, wherein the base is configured to support the lamp stand docking station. The lamp stand docking station also includes a clamp attached to the base. The clamp includes an adjustable arm for securing an external device and a lamp.

Another example embodiment includes a lamp stand docking station. The lamp stand docking station includes a base, wherein the base is configured to support the lamp stand docking station. The lamp stand docking station also includes a first arm connected to the base. The lamp stand docking station further includes a second arm movably connected to the first arm. The lamp stand docking station also includes a clamp attached to the second arm. The clamp includes an adjustable arm for securing an external device and a lamp.

Another example embodiment includes a lamp stand docking station. The lamp stand docking station includes a base, wherein the base is configured to support the lamp stand docking station. The lamp stand docking station also includes a first arm connected to the base. The lamp stand docking station further includes a second arm movably connected to the first arm. The lamp stand docking station also includes a clamp attached to the second arm. The clamp includes a dial and a gear connected to the dial, wherein the gear includes one or more teeth. The clamp also includes a rack, wherein the rack includes one or more teeth configured to interact with the teeth of the gear. The clamp further includes an adjustable arm for securing an external device. The adjustable arm is attached to the rack and includes an aperture. Rotation of the dial is translated to lateral motion of the adjustable arm via the gear and the rack. The clamp additionally includes a lamp, wherein the lamp is configured to produce light which passes through the aperture.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
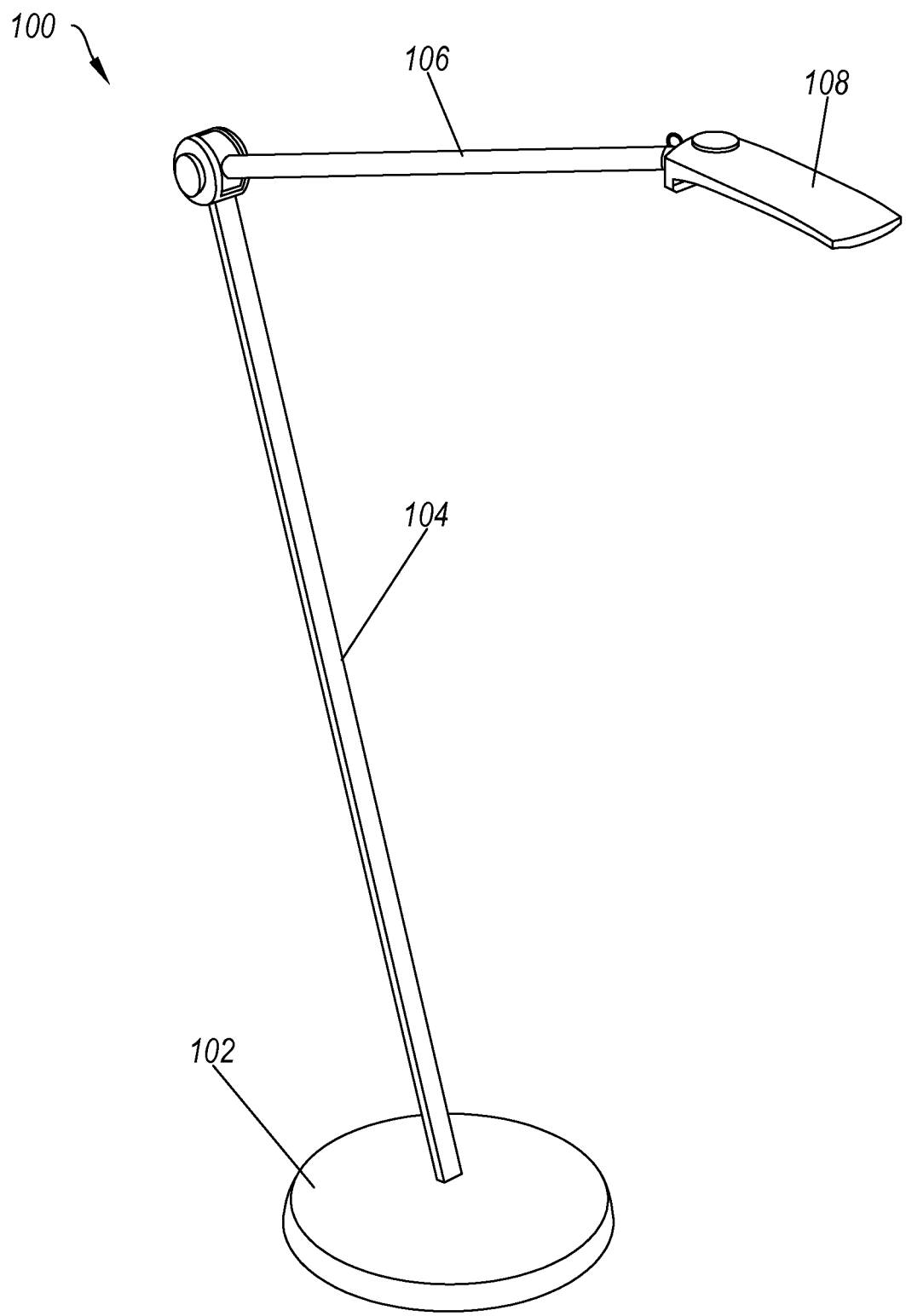
FIG. 1 illustrates an example of a lamp tablet docking station.

FIG. 1 illustrates an example of a lamp tablet docking station 100. The lamp tablet docking station 100 is a lamp stand that acts as a docking station for a tablet or other external electronic device. I.e., the lamp tablet docking station 100 includes the functionality of a lamp, docking station and flexible stand for an external device.

FIG. 1, shows that the lamp tablet docking station 100 can include a base 102. The base 102 can support lamp tablet docking station 100. I.e., the base 102 can be of sufficient width and strength to support the lamp tablet docking station 100. For example, the base 102 can include ballast configured to allow the base 102 to remain flat on a surface even when one or more elements of the lamp tablet docking station 100 are extended, producing torque on the base. For example, the ballast can include steel, lead, or similar materials and/or a generally planar, flat plate shape to fit within the base. Additionally or alternatively, the base 102 can allow the lamp tablet docking station 100 to be secured to a floor, wall, ceiling or other structure. I.e., the base 102 can include mounting hardware or other mechanisms which allow the base 102 to be secured in a desired area.

FIG. 1 also shows that the lamp tablet docking station 100 can include a first arm 104. The first arm 104 can be secured to the base. I.e., the base can support the first arm 104. The first arm 104 can be movably attached to the base 102. I.e., the position of the first arm 104 relative to the base 102 can be adjusted. For example, the angle of the first arm 104 relative to the base 102 can be adjusted and/or the first arm 102 can be rotated relative to the base 102. E.g., the first arm 104 can be attached to the base 102 using a swivel bracket, hinge, pin or any other desired attachment mechanism. The first arm 104 can include any structural element of sufficient strength to support the other portions of the lamp tablet docking station 100. For example, the first arm 104 can include a rod or multiple parallel rods.

FIG. 1 further shows that the lamp tablet docking station 100 can include a second arm 106. The second arm 106 is movably attached to the first arm 104. I.e., the position of the second arm 106 relative to the first arm 104 can be adjusted. For example, the angle of the second arm 106 relative to the first arm 104 can be adjusted and/or the second arm 106 can be rotated relative to the first arm 104. E.g., the second arm 106 can be attached to the first arm 104 using a swivel bracket, hinge, pin or any other desired attachment mechanism. The second arm 106 can include any structural element of sufficient strength to support the other portions of the lamp tablet docking station 100. For example, the second arm 106 can include a rod or multiple parallel rods.

FIG. 1 additionally shows that the lamp tablet docking station 100 can include a clamp 108. The clamp 108 can be configured to secure an external device. I.e., the clamp 108 can allow a user to secure an unsecure an external device. For example, the external device can include a tablet, such as an iPad, electronic book, such as a Kindle or Nook, a cellphone, a laptop, a monitor, a keyboard or any other desired external device. The clamp 108 can be rotatably attached to the second arm 106. I.e., the orientation of the clamp 108, including angle, can be changed relative to the second arm 106.

Figure 2:
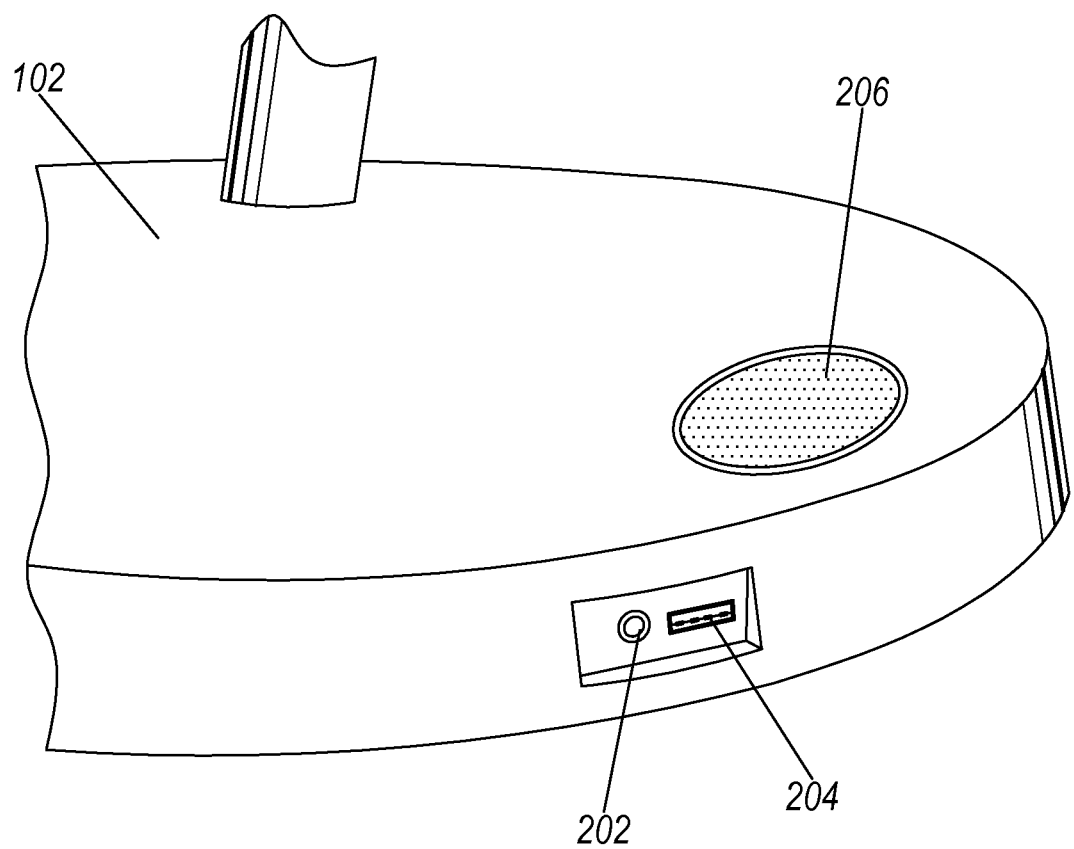
FIG. 2 illustrates an example of a base.

FIG. 2 illustrates an example of a base 102. The base 102 can be configured to support a lamp tablet docking station, such as the lamp tablet docking station 100 of FIG. 1. E.g., the base 102 can allow a lamp tablet data station to be placed in a desired location. For example, the base 102 can be placed on a floor, secured to a surface, such as a wall, placed on the floor or secured in any other desired location.

FIG. 2 shows that the base 102 can include a power supply 202. The power supply 202 can allow electrical power to be supplied to a lamp tablet docking station 100. For example, the power supply 202 can allow the base 102 to be connected to power, such as via an outlet or other power source. Additionally or alternatively, power can be supplied to the base 102 from an internal power source, such as batteries or other power sources.

FIG. 2 also shows that the base 102 can include a data interface 204. The data interface 204 can allow the base to be networked to an external device. For example, the data interface 204 can be attached to a computer, router, printer or any other device. The external device may then be automatically connected to any external device which is secured to a clamp in a lamp tablet docking station, such as the clamp 108 of the lamp tablet docking station 100 in FIG. 1. For example, the data interface 204 can include a Universal Serial Bus (USB) connector, an Ethernet connector, or any other desired connector.

FIG. 2 further shows that the base 102 can include a speaker 206. The speakers 206 can include an electroacoustic transducer that converts an electrical signal into sound that can be perceived by a user. Specifically, the speaker 206 can move in accordance with the variations of an electrical signal and causes sound waves to propagate through a medium. In particular, the speaker 206 can be used to produce sound from a data signal sent to the base 102. The speaker 206 can be part of the base 102 or can include an interface that allows for attachment of external speakers such as a headphone jack.

Figure 3A:
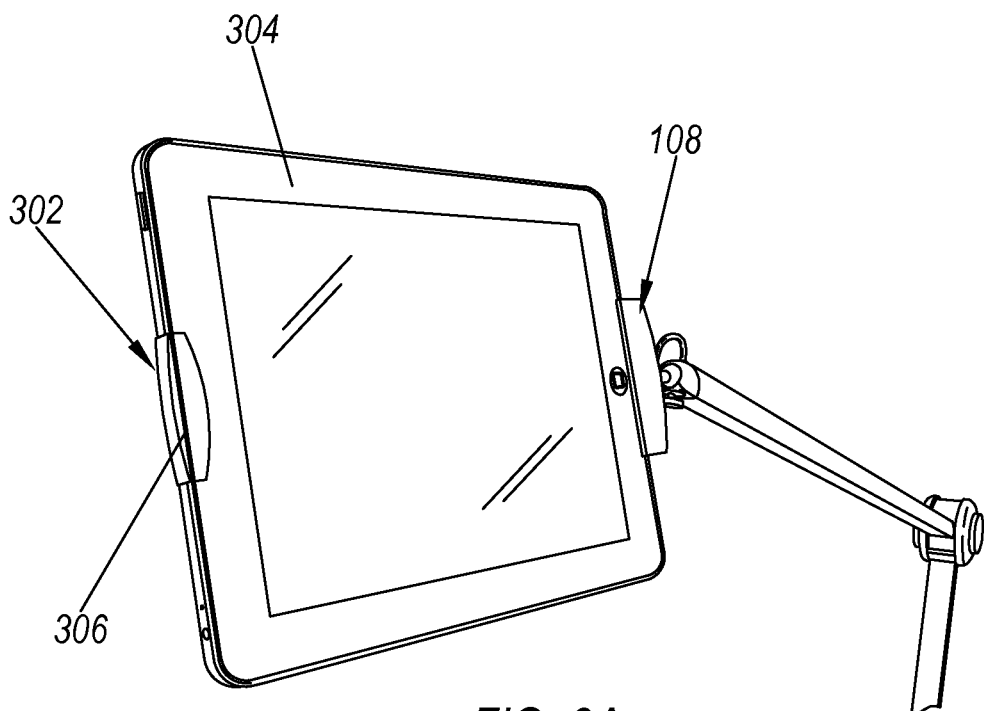
FIG. 3A illustrates a front view of an example of a clamp in use.
Figure 3B:
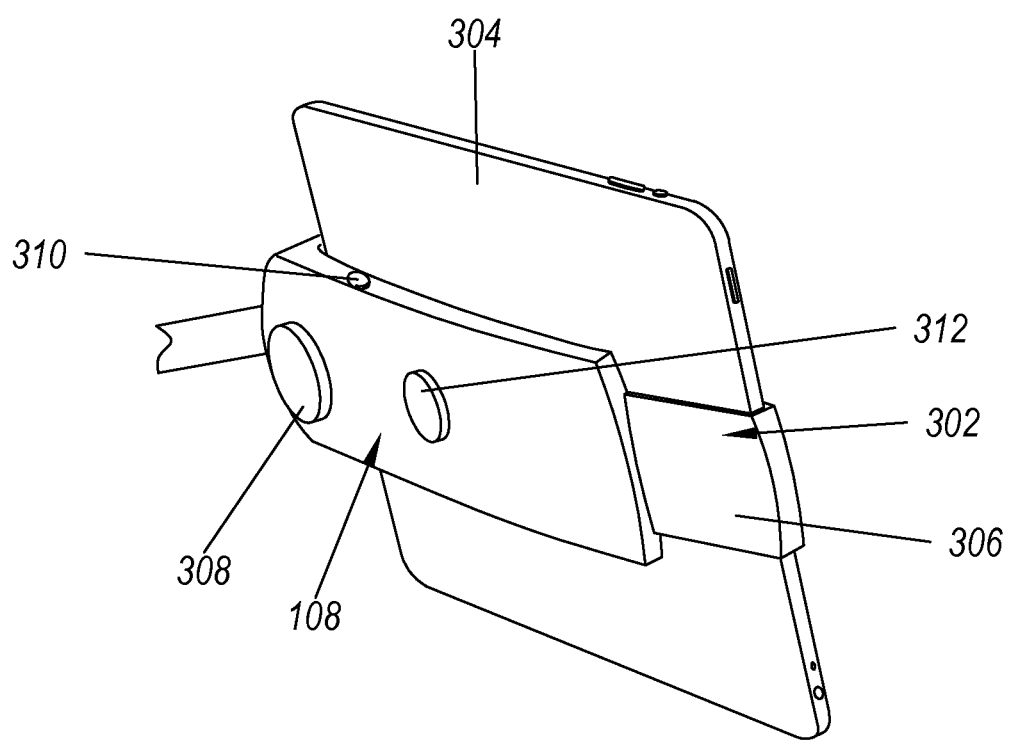
FIG. 3B illustrates a rear view of an example of a clamp in use.

FIGS. 3A and 3B illustrate an example of a clamp 108 in use. FIG. 3A illustrates a front view of an example of a clamp 108 in use; and FIG. 3B illustrates a rear view of an example of a clamp 108 in use. The clamp 108 can be used to secure an external device to a lamp tablet docking station, such as the lamp tablet docking station 100 of FIG. 1.

FIGS. 3A and 3B show that the clamp 108 can include a securing mechanism 302. The securing mechanism 302 can include any device configured to secure an external device 304 within the clamp 108. For example, the securing mechanism 302 can include a hook or lip configured to be placed around the external device 304.

FIGS. 3A and 3B also show that the clamp 108 can include an adjustable arm 306. The adjustable arm 306 can be configured to allow the user to change the position of the securing mechanism 302. I.e., the adjustable arm 306 can allow the user to configure the securing mechanism 302 to match the dimensions of the external device 304.

FIGS. 3A and 3B further show that the securing mechanism 302 can include a dial 308. The dial 308 can be configured to adjust the position of the adjustable arm 306. I.e., the dial 308 can be turned to move the adjustable arm 306 toward or away from the main housing of the clamp 108. In particular, the dial 308 can allow the user to fully configure the size of the clamp 108 in order to accommodate different external devices 304.

FIGS. 3A and 3B additionally show that the securing mechanism 302 can include a quick release 310. The quick release 310 can allow the user to release the securing mechanism 302 and, therefore, the external device 304, without requiring the user to change the adjustable arm 306. I.e., the adjustable arm 306 can be set in a permanent position while the quick release 310 allows for the external device 304 to be secured or released as needed.

FIGS. 3A and 3B moreover show that the securing mechanism 302 can include a switch 312. The switch 312 can be configured to control one or more electronic devices within the clamp 108. For example, the switch 312 can be configured to turn on/off a light within the clamp, adjust the brightness of the light, change lighting features (i.e. allow for different lights to come on or off for a desired effect), control input or output to the electronic device or control any other desired feature. The switch 312 can be any desired mechanism. For example, the switch 312 can include a push button, toggle switch, sensor (e.g., a light sensor) or any other desired switch.

Figure 4:
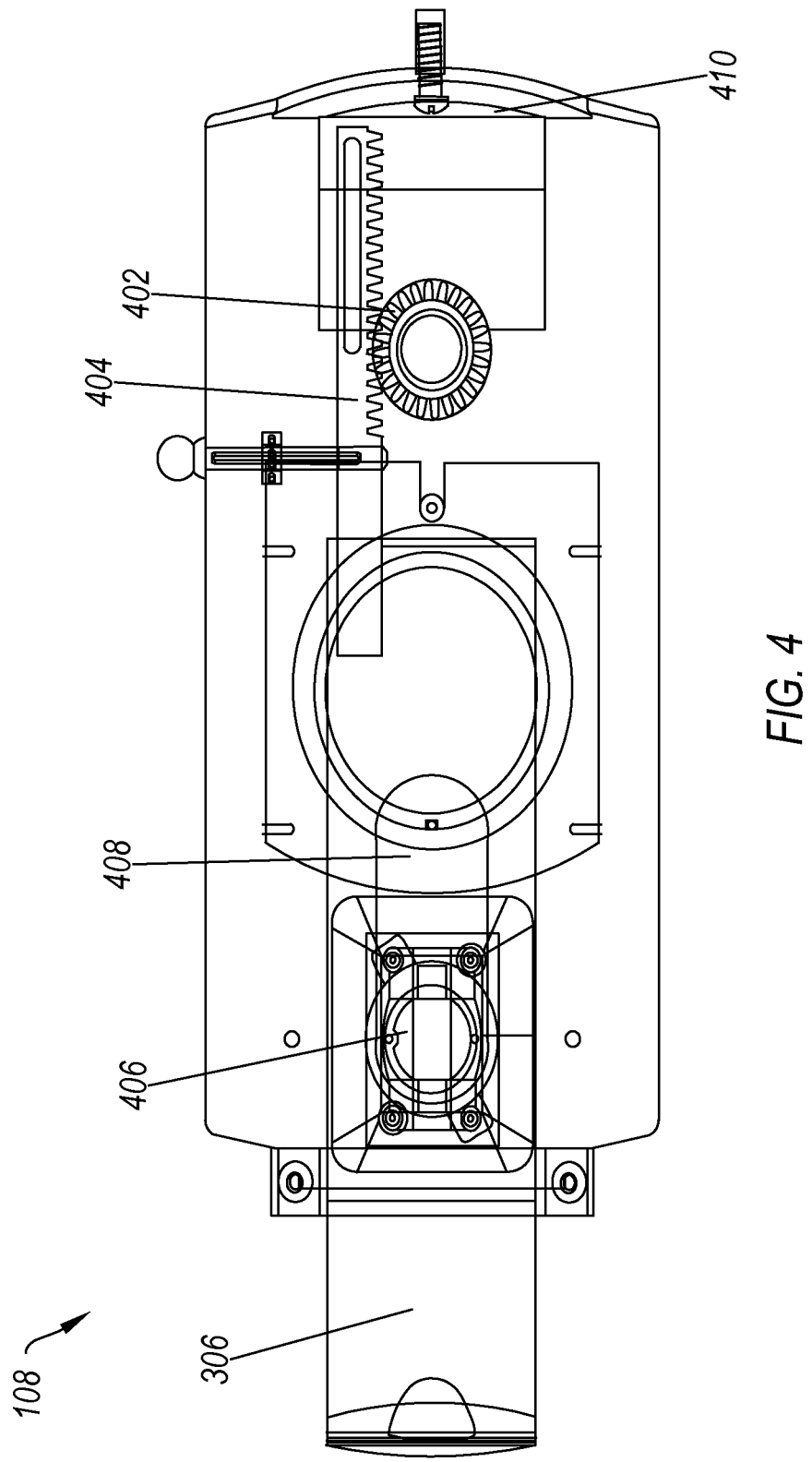
FIG. 4 illustrates an internal view of the clamp.

FIG. 4 illustrates an internal view of the clamp 108. The clamp 108 can be configured to secure an external device. Additionally or alternatively, the clamp 108 can be moved to allow a user to position the external device in any desired orientation.

FIG. 4 shows that the clamp 108 can include a gear 402. The gear 402 can be connected to the dial 308 of FIGS. 3A and 3B. I.e., the dial 308 of FIGS. 3A and 3B can include an internal or attached gear 402 such that when a user rotates the dial 308 of FIGS. 3A and 3B the gear is likewise rotated.

FIG. 4 also shows that the clamp 108 can include a rack 404. The rack 404 can include a linear gear bar. I.e., the rack 404 can include teeth which engage the gear 402 such that rotational motion applied to the gear 402 via the dial 308 of FIGS. 3A and 3B causes the rack 404 to move laterally, thereby translating the rotational motion of the gear 402 into linear motion. The rack 404 is attached to the adjustable arm 306. I.e., the rotation of the dial 308 of FIGS. 3A and 3B is converted to linear motion of the adjustable arm 306, allowing the adjustable arm to secure an external device.

FIG. 4 further shows that the clamp 108 can include a lamp 406. The lamp 406 can include any type of light source including, incandescent, fluorescent, compact fluorescent, LED, LCD or any other desired light source. The lamp 406 can allow the clamp 108 to be used as a lamp when an external device is not secured in the clamp 108. I.e., the clamp 108 can be a lamp which is configured to also secure an external device.

FIG. 4 additionally shows that the adjustable arm 306 can include an aperture 408. The aperture 408 can allow the light produced by the lamp 406 to exit the clamp 108. I.e., light produced by the lamp 406 can shine through the aperture 408 to allow the clamp 108 to act as a lamp. The aperture 408 can be shaped to ensure that the light produced by the lamp 406 will always be able to exit the aperture 408. For example, the aperture 408 can be an oval so that lateral motion of the adjustable arm 306 will not prevent light from passing through the aperture 408.

FIG. 4 moreover shows that the clamp 108 can include a data port 410. The data port 410 can be configured to electrically connect the external device to the clamp 108. I.e., the data port 410 can allow the external device to receive power from the clamp 108. Additionally or alternatively, the data port 410 can allow anything connected to the clamp 108 to be electrically connected to the external device. For example, the data port 410 can connect the external device to a computer or other device through the data interface 204 of FIG. 2.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A lamp stand docking station, the lamp stand docking station comprising:
   a base, wherein the base is configured to support the lamp stand docking station;
   a first arm connected to the base;
   a second arm movably connected to the first arm; and
   a clamp attached to the second arm, wherein the clamp includes:
   a dial;
   a gear connected to the dial, wherein the gear includes one or more teeth;
   a rack, wherein the rack includes one or more teeth configured to interact with the teeth of the gear;
   an adjustable arm for securing an external device, wherein the adjustable arm:
   is attached to the rack; and
   includes an aperture;
   wherein rotation of the dial is translated to lateral motion of the adjustable arm via the gear and the rack; and
   a lamp, wherein the lamp is configured to produce light which passes through the aperture.

2. The lamp stand docking station of claim 1, wherein the base includes ballast.

3. The lamp stand docking station of claim 1, wherein the base is configured to be attached to a surface.

4. The lamp stand docking station of claim 3, wherein the surface includes a wall.

5. The lamp stand docking station of claim 1, wherein the base includes a power supply.

6. The lamp stand docking station of claim 5, wherein the power supply includes a plug configured to be inserted into an outlet.

7. The lamp stand docking station of claim 1, wherein the base includes a data interface.

8. The lamp stand docking station of claim 7, wherein the data interface includes a USB port.

9. The lamp stand docking station of claim 1, wherein the base includes a speaker.

10. The lamp stand docking station of claim 1, wherein the lamp includes an LED.

11. The lamp stand docking station of claim 1, wherein the second arm is attached to the first arm by a swivel bracket.

12. The lamp stand docking station of claim 1, wherein the second arm is attached to the first arm by a hinge.

13. The lamp stand docking station of claim 1, wherein the second arm is attached to the first arm by a pin.

14. The lamp stand docking station of claim 1, wherein the adjustable arm includes a lip.

15. The lamp stand docking station of claim 1 further comprising:
   a quick release, wherein the quick release is configured to allow a user to move the adjustable arm to a desired position.

16. The lamp stand docking station of claim 1 further comprising:
   a data port, wherein the data port is configured to electrically connect the external device to the clamp.

17. The lamp stand docking station of claim 1 further comprising:
   a switch, wherein the switch is configured to control the operation of the lamp.

* * * * *